(12) United States Patent
Esswie

(10) Patent No.: US 12,342,215 B2
(45) Date of Patent: Jun. 24, 2025

(54) LATENCY-AWARE SCHEDULING OF PACKET TRANSMISSION

(71) Applicant: Dell Products, L.P., Round Rock, TX (US)

(72) Inventor: Ali Esswie, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 391 days.

(21) Appl. No.: 18/073,063

(22) Filed: Dec. 1, 2022

(65) Prior Publication Data

US 2024/0187917 A1    Jun. 6, 2024

(51) Int. Cl.
*H04W 28/02* (2009.01)
*H04L 1/08* (2006.01)
*H04L 1/1812* (2023.01)
*H04W 28/12* (2009.01)

(52) U.S. Cl.
CPC .......... *H04W 28/0268* (2013.01); *H04L 1/08* (2013.01); *H04L 1/1812* (2013.01); *H04W 28/12* (2013.01)

(58) Field of Classification Search
CPC .... H04W 28/0268; H04W 28/12; H04L 1/08; H04L 1/1812
See application file for complete search history.

(56) References Cited

U.S. PATENT DOCUMENTS

| | | | |
|---|---|---|---|
| 9,788,321 B2 * | 10/2017 | Wijetunge | H04L 5/0073 |
| 10,362,507 B2 * | 7/2019 | Dao | H04W 28/0268 |
| 11,240,157 B1 * | 2/2022 | Callaghan | H04L 67/141 |
| 11,382,083 B2 * | 7/2022 | Guo | H04W 88/023 |
| 11,412,406 B2 * | 8/2022 | Mukherjee | H04L 1/1812 |
| 2008/0310338 A1 | 12/2008 | Charpenter et al. | |
| 2022/0085922 A1 | 3/2022 | Lu et al. | |

(Continued)

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Bailor C Hsu
(74) *Attorney, Agent, or Firm* — Amin, Turocy & Watson, LLP

(57) ABSTRACT

An application running on a user equipment determines a retransmission request indication for a packet that was not successfully decoded based on a criticality, or quality-of-service requirement, from a retransmission request configuration, which may correspond to a traffic flow managed by the user equipment. The retransmission request indication may correspond to a criteria range in a retransmission request configuration. The application at the user equipment may determine a latency criteria range to use to determine a retransmission request indication based on a sensed degradation of user experience corresponding to the traffic flow. The user equipment may transmit the retransmission request indication to a network node, which may prioritize scheduling of retransmission of the failed-decoding packet or transmission of new packets according to a priority indicated in the retransmission request indication. A combination of retransmission request indications may be indicated by a compression index determined by the user equipment.

20 Claims, 12 Drawing Sheets

(56) References Cited

U.S. PATENT DOCUMENTS

2022/0232411 A1* 7/2022 Vijayakumar .......... H04L 41/40
2022/0322398 A1* 10/2022 Tsai ...................... H04W 72/23
2023/0370894 A1* 11/2023 Mchardy ............... H04W 72/21

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion mailed Feb. 14, 2024 for PCT Application No. PCT/US2023/035944, 21 pages.
ZTE et al: "URLLC PHY enhancements", 3GPP Draft; RI-1808211, RAN WGI, No. Gothenburg, Sweden; [http://www.3gpp.org/ftp/tsg%5Fran/WG1% 5FRL1/TSGR1%5F94/Docs/R1%2DI808211%2Ezip] Aug. 2018, 10 pages.

* cited by examiner

200

1000

LATENCY-AWARE SCHEDULING OF PACKET TRANSMISSION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises receiving, by a user equipment comprising a processor via a radio access network, retransmission request configuration data representative of a retransmission request configuration. In the example embodiment, the user equipment may receive a first portion of a traffic flow; determine that the first portion of the traffic flow comprises a first error; and determine a first quality of service corresponding to the traffic flow. The determining of the quality of service may be based on performance of an application that is using data of the traffic flow. The example method may further comprise analyzing, by the user equipment, the first quality of service with respect to at least one latency function specified by the retransmission request configuration to result in an analyzed first quality of service, determining, by the user equipment, using the retransmission request configuration, a first retransmission request indication corresponding to the analyzed first quality of service, transmitting, by the user equipment via the radio access network, the first retransmission request indication indicating a first retransmission priority for retransmission of the first portion of the traffic flow, and/or receiving, by the user equipment, first retransmission data representative of a first retransmission, responsive to the first retransmission request indication, of the first portion of the traffic flow according to the first retransmission priority. A network RAN may use the retransmission request indication to determine a priority, which corresponds to the analyzed quality of service as determined by the user equipment, to determine scheduling of the first retransmission, and may transmit scheduling information to the user equipment that indicates to the user equipment resources to monitor for a retransmission of the packet that contained the error.

The analyzing of the first quality of service comprises analyzing the quality of service of an application, to which the traffic flow is directed, executing on the user equipment. The first retransmission request indication comprises a hybrid automatic repeat request.

The retransmission request configuration may associate, or map, at least one retransmission request indication index value with respective at least one retransmission request range. The first retransmission request indication may comprise a retransmission request indication index value, of the at least one retransmission request indication index value, corresponding to a retransmission request range, of the at least one retransmission request range, that corresponds to the analyzed first quality of service. The at least one latency function comprises at least one corresponding latency range criterion. A size of the retransmission request indication corresponds inversely to a quantity of the at least one latency function specified by the retransmission request configuration.

The example embodiment method may further comprise receiving, by the user equipment, a second portion of the traffic flow. The user equipment may determine that the second portion of the traffic flow comprises a second error, determine a second quality of service corresponding to the second portion of the traffic flow, and analyze the second quality of service with respect to the at least one latency function specified by the retransmission request configuration to result in an analyzed second quality of service. The example method may further comprise determining, by the user equipment from the retransmission request configuration, a second retransmission request indication corresponding to the analyzed second quality of service. Thus, a second portion of the traffic flow may require different latency in retransmission of the erroneous portion as compared to latency of retransmission required of the erroneous first portion. Such difference may be determined at the user equipment based on an application detecting a change in user experience of processing of the traffic flow.

The example embodiment method may further comprise transmitting, by the user equipment via the radio access network, the second retransmission request indication indicating a second retransmission priority for retransmission of the second portion of the traffic flow. The example embodiment method may further comprise receiving, by the user equipment responsive to the second retransmission request indication, second retransmission data representative of a second retransmission of the second portion of the traffic flow according to the second retransmission priority, wherein the second retransmission priority is different than the first retransmission priority.

In an embodiment, the example method may comprise receiving, by the user equipment, a third portion of the traffic flow, determining, by the user equipment, that the third portion of the traffic flow comprises a third error, determining, by the user equipment, a third quality of service corresponding to the third portion of the traffic flow, analyzing, by the user equipment, the third quality of service with respect to the at least one latency function specified by the retransmission request configuration to result in an analyzed third quality of service, determining, by the user equipment from the retransmission request configuration, a no-retransmission acknowledgment indication (e.g., an ACK) corresponding to the third quality of service, and/or transmitting, via the radio access network, the no-retransmission acknowledgment indication.

In an embodiment, in the retransmission request configuration, the first retransmission priority and the second retransmission priority correspond to traffic having a first importance and a second importance, respectively, according to a defined importance criterion, and wherein the first retransmission priority and the second retransmission priority are higher than a default retransmission priority associated with a default retransmission request indication. The default retransmission request indication may comprise a one-bit indication.

In another embodiment, the retransmission request configuration data representative of the retransmission request configuration may comprise retransmission request indication compression configuration data representative of a retransmission request indication compression configuration, and wherein the retransmission request indication compression configuration associates at least one compression index with at least one respective combination of a determined number of retransmission request indications correspond to a determined number of packet receptions for which a retransmission request indication or an acknowledgment indication is to be transmitted by the user equipment. The determined number of retransmission request indications may define a compression period. The determined number of packet receptions may comprise a compression period.

In another example embodiment, a user equipment, comprises a processor configured to: receive, via a radio access network, a first portion of a first traffic flow, determine that the first portion of the first traffic flow comprises a first error; receive, via the radio access network, a second portion of a second traffic flow, and determine that the second portion of the second traffic flow comprises a second error. The user equipment processor may determine a first quality of service corresponding to the first traffic flow, determine a second quality of service corresponding to the second traffic flow, analyze the first quality of service with respect to first latency ranges defined by a first retransmission request configuration to result in an analyzed first quality of service, and analyze the second quality of service with respect to second latency ranges defined by a second retransmission request configuration to result in an analyzed second quality of service.

The user equipment processor may determine, from the first retransmission request configuration, a first retransmission request indication corresponding to the analyzed first quality of service, and determine, from the second retransmission request configuration, a second retransmission request indication corresponding to the analyzed second quality of service. Thus, the processor may use different retransmission request configurations for different respective traffic flows to determine different retransmission request indications.

The user equipment processor may transmit, via the radio access network, the first retransmission request indication indicating a first priority associated with the first traffic flow, and transmit, via the radio access network, the second retransmission request indication indicating a second priority associated with the second traffic flow. The processor of the user equipment may receive, via the radio access network, a first retransmission, responsive to the first retransmission request indication, of the first portion of the first traffic flow according to the first priority, and receive, via the radio access network, a second retransmission, responsive to the second retransmission request indication, of the second portion of the second traffic flow according to the second priority. The scheduling of the first and second retransmissions may be scheduled by the RAN based on the first priority and the second priority.

The processor may be further configured to receive a scheduling indication via the radio access network indicating scheduling of downlink resources to be used to receive the first retransmission and the second retransmission, and wherein the scheduling of downlink resources is based on the first priority and the second priority.

In an embodiment, the user equipment may be further configured to receive a third portion of the first traffic flow associated with a third priority, wherein the first portion of the first traffic flow and the second portion of the second traffic flow are received before the third portion of the first traffic flow, and wherein the third portion of the first traffic flow is received before the first retransmission of the first portion of the first traffic flow is received and before the second retransmission of the second portion of the second traffic flow is received, based on the third priority being higher than the first priority and the second priority.

The first retransmission request configuration may comprise first retransmission request indication indices corresponding to the first latency ranges, wherein the second retransmission request configuration comprises second retransmission request indication indices corresponding to the second latency ranges, and wherein each of the first retransmission request indication indices comprises a first number of bits corresponding to the first priority and each of the second retransmission request indication indices comprises a second number of bits corresponding to the second priority. The first number of bits is higher than the second number of bits in correspondence with the first priority being higher than the second priority.

In an embodiment, an example non-transitory machine-readable medium may comprise executable instructions that, when executed by a processor of a user equipment, facilitate performance of operations, comprising: receiving, from network equipment of a radio access network, a first retransmission request configuration, receiving, from the network equipment, a second retransmission request configuration, receiving a first portion of a first traffic flow, and receiving a second portion of a second traffic flow. The operations may comprise determining that the first portion of the first traffic flow comprises a first error and that the second portion of the second traffic flow comprises a second error; and determining a first quality of service corresponding to the first portion of the first traffic flow and a second quality of service corresponding to the second portion of the second traffic flow. The operations may further comprise analyzing the first quality of service with respect to at least one first latency criterion of the first retransmission request configuration to result in an analyzed first quality of service, and analyzing the second quality of service with respect to at least one second latency criterion of the second retransmission request configuration to result in an analyzed second quality of service. The operations may further comprise determining from the first retransmission request configuration, a first retransmission request corresponding to the analyzed first quality of service and having a first retransmission priority, determining from the second retransmission request configuration, a second retransmission request corresponding to the analyzed second quality of service and having a second retransmission priority, and transmitting, to the network equipment, a first retransmission request indication indicating at least the first retransmission request or the second retransmission request.

In an embodiment of the non-transitory machine-readable medium, the first retransmission request may comprise a first one of multiple first retransmission requests that are represented in the first retransmission request configuration and each of the multiple first retransmission requests may comprise a first number of bits corresponding to the first quality of service. The second retransmission request may comprise a second one of multiple second retransmission requests that are represented in the second retransmission request configuration and each of the multiple second retransmission requests may comprise a second number of bits corresponding to the second quality of service. In the embodiment, the first number of bits and the second number of bits may be different corresponding to different qualities of service, or different importance of the first portion of the first traffic flow (or of the first traffic flow itself) and the second portion of a second traffic flow (or of the second traffic flow itself).

In another embodiment of the non-transitory machine-readable medium, the operations may further comprise receiving a third portion of the second traffic flow, determining a third quality of service corresponding to the third portion of the second traffic flow, analyzing the third quality of service with respect to the at least one second latency criterion of the second retransmission request configuration to result in an analyzed third quality of service, determining from the second retransmission request configuration, a third retransmission request corresponding to the analyzed third quality of service, and transmitting, to the network equipment, a second retransmission request indication indicating the third retransmission request.

In yet another embodiment of the example non-transitory machine-readable medium, the first retransmission request indication may comprise a compression index that corresponds to the first retransmission request and the second retransmission request, wherein the first retransmission request comprises a first number of bits and the second retransmission request comprises a second number of bits, and wherein the compression index comprises fewer bits than a sum of the first number of bits and the second number of bits. The compression index may be associated with a combination of a determined number of retransmission request indications or acknowledgement indications that corresponds to a determined number of packet decoding instances, which may be referred to as a compression period.

DETAILED DESCRIPTION OF THE DRAWINGS

Figure 1:
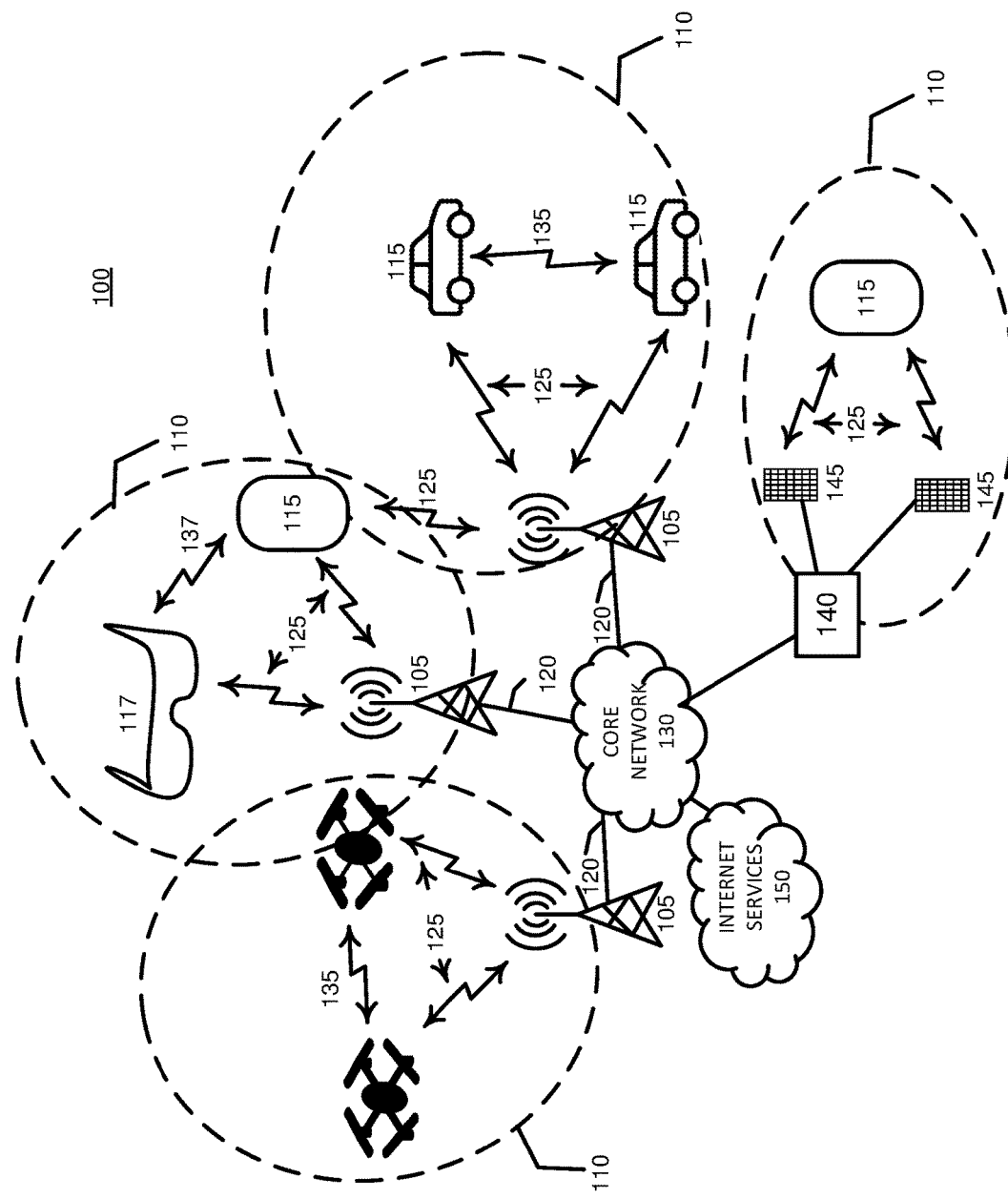
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC 10e−5 reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels. This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that are relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to 5 Mbps URLLC link with a 1 ms radio budget, some XR applications need 100 Mbps links with a couple of milliseconds of the allowed radio latency. Thus, 5G radio design and associated procedures may be adapt to the new XR QoS class and associated targets.

XR service may be facilitated by traffic having certain characteristics associated with the XR service. For example, XR traffic may typically be periodic with time-varying packet size and packet arrival rate. In addition, different packet traffic flows of a single XR session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Hybrid automatic repeat request (HARQ) may be used for packet retransmission and packet combining in case of a failed decoding of a packet's first transmission, and typically enhances radio reliability between a RAN and a user equipment. User equipment devices may send HARQ ACK/NACK feedback reports towards a serving cell RAN indicating a successful or failed downlink packet reception and decoding, and the RAN typically prioritizes retransmission of packets for which decoding failed over transmission of newly-arriving packets. However, for critical use cases, such as VR, not all traffic may be equally important or have an equal impact on a user's quality of experience. Accordingly, not all packet HARQ retransmissions should be equally prioritized over transmission of newly-arriving packet transmission. For example, for a smart glass which is streaming a broadband video, it is desirable for the smart glass device to rapidly receive packet retransmissions, particularly for packets that correspond to the pose, or front, viewing coverage while latency targets can be relaxed for packets contributing to the peripheral sides of the viewing coverage of the smart glass device, since jitter associated with packets contributing to peripheral views may not impose dizziness or fuzziness. Instead of prioritizing HARQ packet retransmissions over new packet transmissions, regardless importance or latency tolerance of packets (new or already transmitted), for critical and capacity-demanding services, which may be negatively impacted by latency associated with the new packet arrivals due to the retransmission of non-important packets, a latency-aware HARQ packet retransmission procedure is disclosed, such that HARQ packet retransmissions are handled and dynamically prioritized based on their respective importance and scheduling latency allowance, derived from the application point of view (e.g., from the perspective of a VR application operating a smart glass). Using latency-aware retransmission indications avoids a scheduler of a RAN node in prioritizing many non-critical packet retransmissions at the expense of transmission of more critical new packet arrivals. The RAN scheduler may be made aware of the priority of a packet based on a latency-aware retransmission request indication received from a user equipment that corresponds to a latency tolerance or importance of the HARQ packet retransmissions. Accordingly, the RAN may schedule new and retransmission of packets based on their respective, and potentially differing, latency requirements as determined by the user equipment, or by an application running on the user equipment.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTD may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network. 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions. P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna, arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Hybrid Automatic Repeat Request ("HARQ")

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ). HARQ may improve throughput at the MAC layer in poor radio conditions (e.g., low signal-to-noise conditions). In some examples, a device may support same-slot HARQ feedback, where the device may provide HARQ feedback in a specific slot for data received via a previous symbol in the slot. In other cases, the device may provide HARQ feedback in a subsequent slot, or according to some other time interval.

HARQ procedures may be used in cellular networks to retransmit, by a RAN node 105, a packet, perhaps multiple times, towards an intended receiving user equipment 115 in case the user equipment did not successfully receive or decode one or more previous transmissions of a packet. For each downlink transmission from the network RAN 105 to a user equipment device 115, the UE device transmits HARQ feedback signaling using an uplink channel resource to indicate to the serving RAN whether a downlink packet is successfully received and successfully decoded or not—if a packet is not successfully received or decided by a user equipment the RAN node may retransmit the packet for which receiving or decoding failed. RAN nodes conventionally blindly prioritize scheduling of packet retransmission over scheduling of transmission of new packet arrivals. Thus, HARQ procedures enhance the radio reliability due to packet retransmissions. At user equipment 115, when a packet is not successfully decoded, the UE buffers received payload and transmits a HARQ negative acknowledgement ("NACK") towards the transmitting RAN node to indicate that the packet was not successfully received or decoded. When user equipment device 115 receives the packet retransmission, the user equipment may combine the received packet with one or more previous receptions of the packet, and attempt decoding on the combined packet, leading to a better decoding ability due to 'combining gain'. Retransmitted packets may typically be retransmitted according to the same transmission configuration of the one or more previous transmissions/retransmission to facilitate combining.

One or more HARQ process identifier(s) may be defined and associated with a downlink flow transmission. Multiple downlink flows may be transmitted to the same receiving device without having received HARQ feedback. The progress of a certain flow may depend on received HARQ feedback associated with the flow and a corresponding HARQ process identifier associated with the flow. Multiple HARQ process identifiers may facilitate pipeline transmission of multiple flows without delaying the transmission of flows for which HARQ feedback has not been received from the device.

5G-advanced may support extreme-capacity-demanding and low-latency-demanding services such as virtual reality, extended reality, holographic communications, etc. Such an application or service uses a correspondingly extreme amount of network resource capacity provided by a RAN serving a device that is running the application or service. However, it is desirable to optimize several radio aspects and procedures to boost offered radio capacity resources of a RAN.

As discussed above, HARQ procedures may be used by user equipment to indicate to serving cells (e.g., a RAN node) whether a transmitted downlink packet is successfully decoded or not. In case of a failed packet decoding and receiving a HARQ NACK indicating as much, the network RAN node typically immediately and blindly prioritizes scheduling of retransmitting of a packet indicated in the HARQ NACK ahead of, or over, scheduling of transmission of newly arriving packets for a given flow. However, for extreme-capacity-demanding and latency-critical services, it is deemed that not all packets are equally important (e.g., not equally impacting user experience) and thus not all HARQ-indicated packet retransmissions are equally important. For example, packets contributing to video flows in the pose/front direction 202 of a smart glass appliance 117 are far more important than those contributing to the streaming on the sides or edges (e.g., for rendering on peripheral portions 204 or 206 of appliance 117 shown in FIG. 2), due to the pose portions being more observed by human eyesight. Therefore, extended delays for packet transmissions and respective HARQ packet retransmissions for a traffic flow corresponding to a pose portion 202 of a smart glass appliance 117 may lead to user dizziness, and several safety hazards, whereas similar packet delay for a floc corresponding to a peripheral portion 204 or 206 may not create a perceptibly degraded experience to a user of the VR smart glass appliance.

Thus, blind prioritization of HARQ packet retransmissions over new packet arrivals may disregard the importance of the new packets and corresponding potential latency tolerance associated with each payload retransmission and instead retransmit non-critical, less critical, or less important packet payload corresponding to a HARQ-indicated retransmission request, with the result that new critical packet arrivals may exhibit extended buffering delays.

Embodiments disclosed herein minimize blind prioritization of HARQ payload retransmission over transmission of new packet arrivals by taking into account importance of a packet, or other portion of a traffic flow (e.g., impact on a user's experience that delaying a packet may cause is taken into account), and scheduling latency tolerance. Accordingly, embodiments disclosed herein reduce buffering latency of new critical packets arriving at a RAN for transmission to a UE in a situation where multiple packets are indicated for retransmission in a HARQ retransmission indication. With latency-aware HARQ feedback procedures, as disclosed herein, a RAN node scheduler may be made aware of a latency tolerance associated with each HARQ-indicated payload retransmission, and accordingly, the RAN may avoid blind HARQ retransmission prioritization. Embodiments disclosed herein may also facilitate schemes for HARQ feedback reporting and overhead compression to dynamically tradeoff consuming of uplink resources for reporting of the HARQ feedback reports versus HARQ feedback reporting latency.

Figure 2:
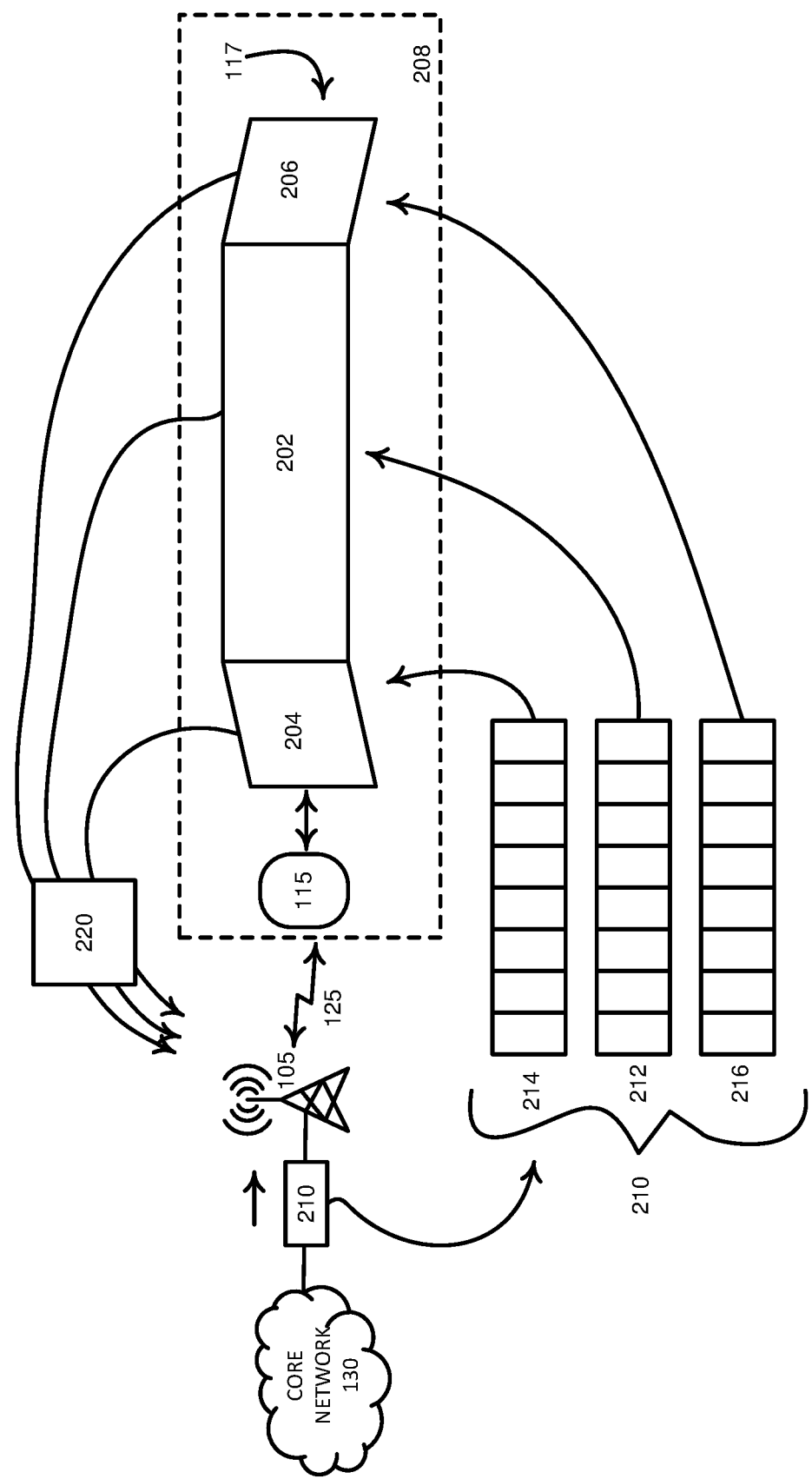
FIG. 2 illustrates an example virtual reality appliance in a wireless network environment.

FIG. 2 illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases, but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to 5 Mbps URLLC link with a 1 ms radio latency budget, some XR applications require 100 Mbps links with about 2 ms allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing XR services may be at least partially determined according to satisfaction of users of the XR services. Each XR-service-using user may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Traffic 210 directed to UE 115 for an XR session at appliance 117 may arrive at RAN 105 from core network 130 via wireless link 125. It will be appreciated that UE 115 and appliance 117 may be different devices, or components that compose, or make up, UE 115 and appliance 117 may be combined into a device 208, such as an XR appliance that comprises components that facilitate wireless communication with RAN 105. For purposes of discussion, UE 115 and appliance 117 may be referred to as separate devices. Traffic 210 may be buffered at RAN 105. Link 125 may be subjected to interference, or other network conditions, that result in an error in reception of any of packets 212, 214, or 216 that correspond to the same traffic flow, or different traffic flows, of traffic 210 directed to portions 202, 204, and 206, respectively, of appliance 117.

Due to errors caused by transmission problems between RAN 105 and UE 115, the UE may determine a retransmission request indication 220 to transmit to the RAN. Retransmission request indication 220 may comprise a HARQ NACK message, or an indication requesting retransmission. Retransmission request indication 220 may comprise an indication for RAN 105 to retransmit one of packets 212, for example, but not a request to retransmit one or more of packets 214 or 216, even though packets 212, 214, and 216 all may correspond to a given traffic flow 210 directed to UE 115 for the same VR/XR session. A determination made by UE 115 to request retransmission of some, but not all, of packets 212, 214, or 216 may be based on the quality-of-service criterion, for example a latency criterion, corresponding to packets 212, 214, or 216, or corresponding to one or more flows that the packets are part of. For example, because packets 212 may be intended to be used to render images via pose portion 202 of appliance 117, a more stringent quality-of-service criterion or tolerance, for example a jitter tolerance, drop-packet tolerance, or a latency tolerance, may be applicable to packets 212 but a different, less stringent, criterion or tolerance may be applicable to packets 214 or 216 because of a human wearer of appliance 117 being more sensitive to fuzziness, or other types of distortion, that may negatively impact images rendered in pose portion 202 as compared to peripheral portions 204 or 206 of the appliance.

Latency-Aware Packet Retransmissions.

As discussed above, conventional HARQ retransmission procedures typically support an ACK or a NACK as HARQ feedback, transmitted from user equipment devices towards a serving cell RAN, indicating either a successful or failed packet decoding, respectively. Scheduling at the RAN node may blindly prioritize retransmission of packets corresponding to a NACK before transmission of new packet arrivals at the RAN that are directed to the user equipment. For high-data, low-latency-demanding services such as VR, not all packets are equally important and thus not all packet retransmissions are equally important. In case of many non-critical packets indicated for retransmission, network resource capacity may be consumed for retransmission that may effectively preempt transmission of new packet arrivals.

Techniques and embodiments disclosed herein may configure a user equipment, or use configurations at user equipment, to generate and report latency-aware HARQ NACK feedback retransmission indications that can provide a network scheduler at a RAN with information regarding an allowable latency budget (e.g., a latency criterion) corresponding to a traffic payload portion, such as a packet, packets, data frame, and the like, for which retransmission is requested by the user equipment. Thus, at the RAN conventional blind prioritization of packet retransmissions over possible critical new packet arrivals may be avoided.

In an embodiment, a network RAN may generate a codebook that defines multiple HARQ NACK indications, where each NACK is associated with a configured latency budget (e.g., a latency criterion, or criteria). Thus, at a user device, upon determining a failed decoding of a received downlink payload, a user equipment may determine an application-specific (e.g., a VR application running on a VR appliance such as a smart glass appliance) allowable latency for packet retransmission such that the user experience is not impacted due to blind prioritization of packet retransmission. Accordingly, the user equipment may select a HARQ NACK retransmission indication, for a packet of a flow that may have been received with an error, that is associated with a latency range in the configured codebook that corresponds to an allowable latency for the flow as determined by the application (e.g., a VR application running on a VR appliance). In a case of a user equipment device receiving multiple flows, multiple different HARQ process identifiers corresponding to one or more different traffic flows may facilitate a RAN in associating a reported latency-aware HARQ NACK retransmission indication feedback message with a certain subset of active HARQ process identifiers or traffic flows. Reporting overhead usage may be increased for a latency-aware NACK indication, which may comprise more bits than a conventional NACK (that is not latency-aware), for reporting NACK indications for critical traffic flows, but HARQ retransmissions may in turn be prioritized according to a true and near-real time allowable latency budget, as determined at the application layer (e.g., by a device application itself). Thus, a network RAN resource scheduler, based on receiving latency-aware NACK retransmission request indications, can flexibly, intelligently, and dynamically schedule old packet retransmissions (e.g., packets previously transmitted one or more times) and transmission of new packet arrivals without transmission of the new packets being dictated by, or effectively preempted by, retransmission of pending old, non-critical packets retransmissions, thus minimizing transmission of newly-arrived critical packets from suffering from resource capacity starvation.

By using a retransmission indication that may vary in size to accommodate indicating different priorities of traffic flows, or portions of traffic flows, such as, for example, packets for important traffic flows directed to a particular application, a radio access network RAN can prioritize scheduling of more important packets of an important flow relative to less important packets of the flow, or another less important flow, instead of the less important packets being scheduled for retransmission before retransmission, or transmission, of more important packets of the flow, which may be thought of as effectively 'preemption' of transmission/retransmission of the more important packets by retransmission of the less important (although perhaps still important) packets. For example, a traffic flow directed to a VR application processing images to be rendered on an VR appliance, such as appliance 117 shown in FIG. 2, may carry one or more packets, images, or frames to be rendered in pose portion 202 of VR appliance 117 shown in FIG. 2 may be more important than a traffic flow carrying images or frames to be rendered in portions 204 or 206 of the VR appliance. A latency-aware multi-bit HARQ feedback, which may be referred to retransmission indication, may be associated with one or more certain HARQ process identifiers, which association may facilitate a RAN in absorbing, or trading off, additional reporting overhead used by a latency-aware retransmission indication HARQ NACK for important flows (as compared to lesser reporting overhead used by conventional, non-latency-aware feedback), and determining a set, or subset, of important flows to be enabled for latency-aware multi-bit HARQ feedback.

Figure 3A:
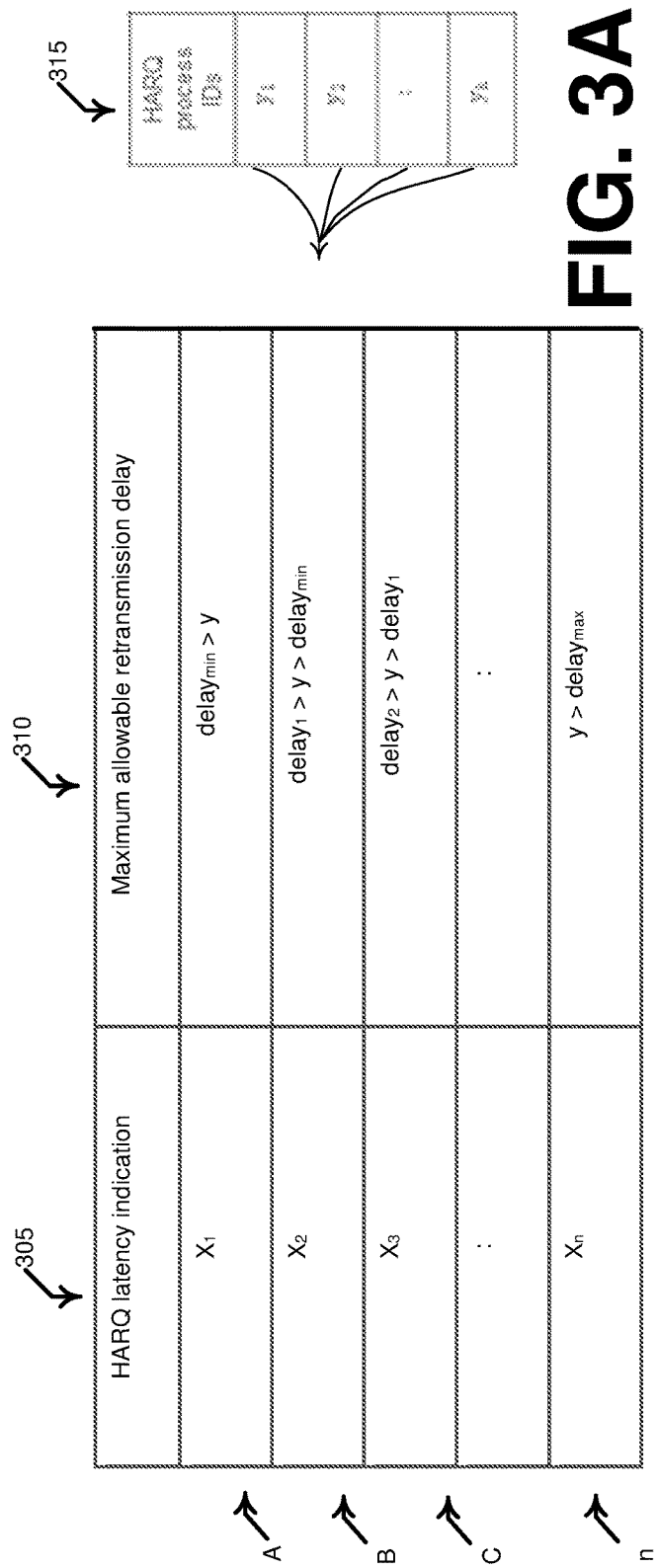
FIG. 3A illustrates an example retransmission request configuration.

Turning now to FIG. 3A, the figure illustrates an example codebook 300, or mapping, of HARQ NACK indications 305 with a configured, application-specific allowable latency budget 310, which budget may be referred to as a latency criterion/criteria or latency function. Codebook 300, which may comprise retransmission request configuration data representative of a retransmission request configuration and may be referred to as a retransmission request configuration, may be 'signaled' or transmitted a user equipment via, for example, radio resource control ("RRC") signaling, as part of the connection establishment procedures, or as part of a downlink control information ("DCI") dynamic configurations. Upon failing to decode a certain downlink received packet, a user equipment may compile a latency-specific HARQ feedback report, by selecting and transmitting a HARQ NACK indication 305 or sequence that corresponds to a latency range, or criteria, 310 that satisfies a latency allowance, or requirement, of an application running on the user equipment, for example a VR application. An allowable latency, or requirement, may be determined from the application layer (e.g., a VR application may convey a latency requirement for a certain quality of service) such that any latency impact on an end user experience is facilitated by the corresponding criterion/criteria 310.

After the network RAN receives the HARQ NACK indications corresponding to different latency budgets, a scheduler at the RAN may dynamically schedule packet retransmissions and new packet arrivals for different devices in an efficient manner and avoid such transmissions or retransmissions being dictated (e.g., in essence being pre-empted), by non-critical packet retransmissions, while also scheduling transmission or retransmission of critical/important packet with a tight latency budget to facilitate prioritizing transmission or retransmission of such critical/important packets so that the critical/important packets are not neglected (e.g., buffered at the RAN) in favor of less critical traffic packets. As part of a codebook configuration 300, some entries of the proposed HARQ feedback listing in the codebook can be set to NULL or extended latency beyond threshold, to indicate to the serving cell RAN node to discard scheduling of packet retransmissions corresponding to packets to which a retransmission indication containing the Null entry pertains. Different HARQ process identifiers 315 may be associated with different retransmission request indication configurations 300. A RAN may indicate to a user equipment which HARQ process identifiers 315 correspond to one configuration 300 or to another configuration 300. Such a determination and indication may be based on network conditions and may indicate to the user equipment to use a configuration 300 with smaller (e.g., fewer bits) retransmission request indications when network conditions (especially upstream conditions) are constrained and may indicate to use a configuration 300 with larger retransmission request indications when network conditions are less constrained. The RAN may indicate to the RAN to use a default one-bit NACK based on network conditions. The RAN may indicate to the user equipment to use larger-bit retransmission request identifiers for specific traffic if more precise priority scheduling may benefit network conditions.

Figure 3B:
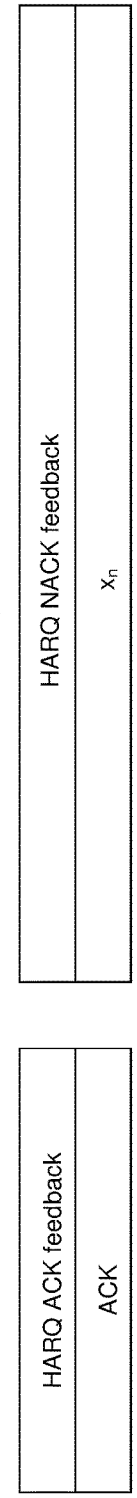
FIG. 3B illustrates a variable size retransmission request indication of no-acknowledgement that can accommodate varying number of latency ranges, corresponding to different respective analyzed qualities of service, and can indicate retransmission of one or more packets.

Turning now to FIG. 3B, two different HARQ feedback reports can be transmitted from a user equipment. An ACK report 325 of fixed size corresponding to a certain packet, code block, code block group, or full transport block may be transmitted indicating that the packet, code block, code block group, or full transport block was successfully received and decoded by at user equipment sending the ACK report. An ACK report 325 may comprise a 1-bit size. A HARQ NACK report, which may be referred to as a retransmission request indication as disclosed herein, may be of variable size due to the dynamic configuration of the HARQ NACK levels in the configured HARQ NACK codebook 300. A NACK feedback report 330 may comprise a retransmission request indication 305. Depending on how many different functions, ranges, or criteria 310 (e.g., how many rows A-n) are configured in codebook 300, a size of retransmission request indications 305 may comprise different numbers of bits. For example, if codebook 300 comprises four different configured latency functions, ranges, or criteria, 310, a NACK feedback report 330 may comprise two bits; if the codebook comprises sixteen rows corresponding to sixteen different latency functions/ranges/criteria, a NACK feedback report 330 may comprise four bits to represent the different ranges 310. In an embodiment, for a serving cell RAN node, when a higher latency precision is targeted for one or more HARQ processes, the RAN node may configure user equipment devices with a HARQ NACK codebook 300 of a large number of levels (e.g., large number of rows A-n in FIG. 3A), wherein the latency criteria associated with each HARQ NACK indication may span reduced ranges, thus increasing the number of HARQ NACK indications 305 (and increasing the precision of quality of service and priority) associated with a flow. Having more ranges 310 (e.g., more rows A-n), in codebook 300, accordingly increases a number of bits used (overhead) for indications 305 in HARQ NACK reports, and vice versa (fewer number of ranges 310 results in fewer bits used for indications 305 but less priority/quality of service precision corresponding to a flow conveyed to a RAN by indications 305). Uplink control channel resource, which may carry the uplink HARQ feedback from a user equipment, may be dynamically allocated from a RAN node to suit a user equipment's HARQ NACK report configuration size of indications 305. (Suitability may be based on a quality of service required for a particular application running on, or executing on, a user device).

Figure 4:
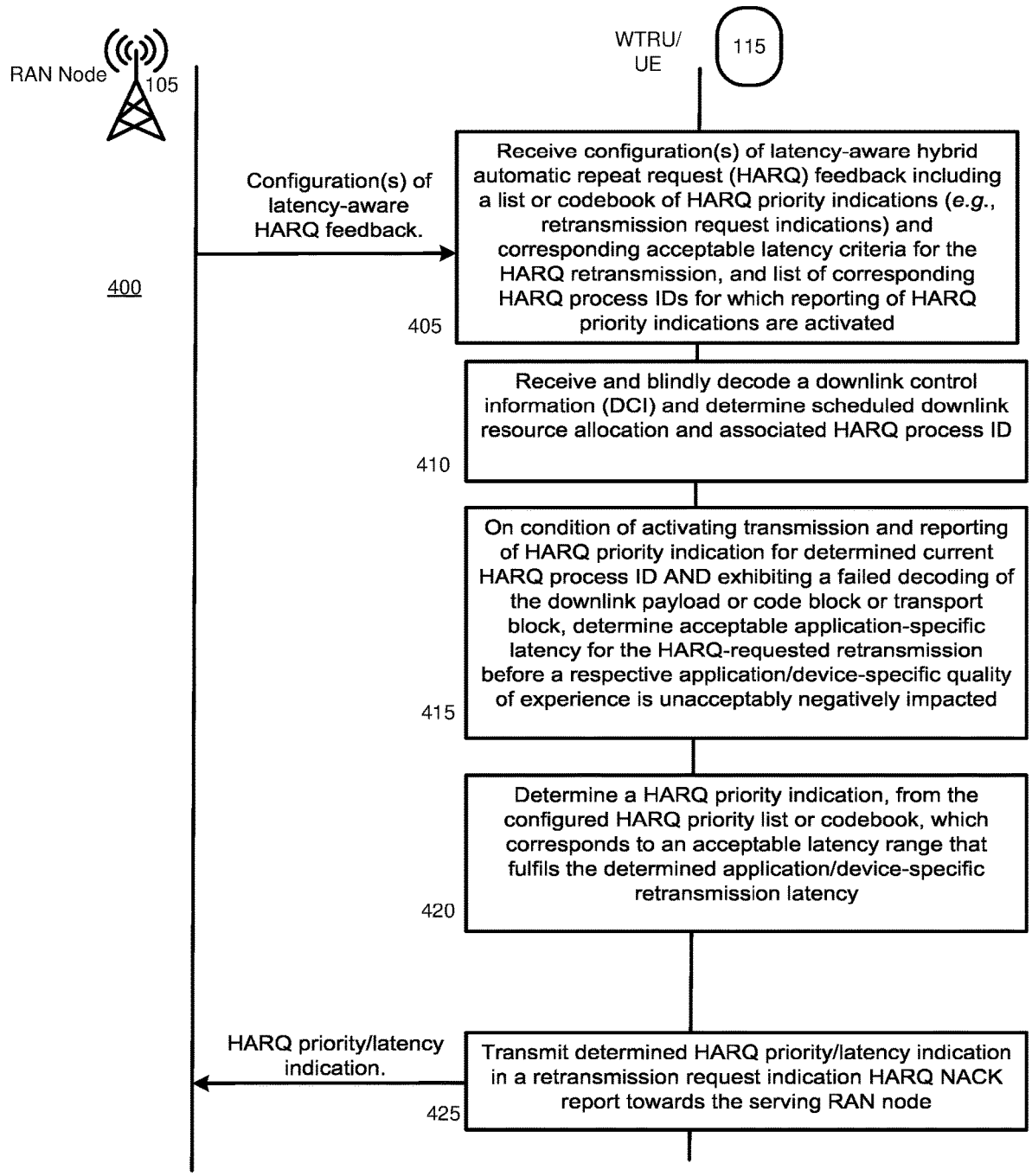
FIG. 4 illustrates a timing diagram of an example method embodiment to reschedule traffic packets based on a latency criterion.

Turning now to FIG. 4 the figure illustrates a timing diagram 400 showing acts for a UE 115 to use a retransmission request configuration to indicate to RAN 105 a scheduling priority of traffic packets that may not have been received correctly at the UE. At act 405, RAN 105 transmits and UE 115 receives, a latency-aware retransmission request configuration comprising latency-aware hybrid automatic repeat request (HARQ) feedback indications, which may be referred to a retransmission request indications. The retransmission request configuration may comprise a list or codebook of HARQ priority indications and corresponding respective latency criteria, or ranges. The codebook may be used by UE 115 to determine a retransmission request indication associated with a HARQ process identifier for a traffic flow for which transmission and reporting of the HARQ priority indications are activated. Such activation may be determined by an application running on UE 115, for, example, a VR application facilitating use of a VR appliance. At act 410, UE/WTRU 115 receives and blindly decodes a downlink control information and determines a scheduled downlink resource allocation, and associated HARQ process ID for a traffic flow. On condition of activating transmission and reporting of HARQ priority indications, using the codebook, for a determined current HARQ process ID and a UE failing to decode a payload (e.g., a packet, a code block, or transport block) UE/WTRU determines at act 415 an acceptable application-specific latency for the HARQ retransmission that can be tolerated by the VR application before a device-specific quality of experience is impacted. At act 420 UE/WTRU determines a HARQ priority indication, from the configured HARQ priority list or codebook, which corresponds to an acceptable latency range that satisfies, or matches, the determined application-specific retransmission latency requirement. At act 425, UE/WTRU 115 transmits the determined HARQ priority/latency retransmission request indication in a HARQ NACK report to RAN node 105, which indication may comprise a number of bits corresponding to a precision of the retransmission request indication as described above in reference to FIG. 3A.

Latency-Driven HARQ Feedback Reporting and Feedback Overhead Compression.

HARQ feedback indications, transmitted from user equipment devices to serving cell RANs, can dictate the uplink control usage and corresponding capacity because HARQ feedback is frequently transmitted per device and is to maximize radio reliability of critical traffic. HARQ feedback semi-static and dynamic codebooks may be adopted for aggregating the HARQ feedback over several downlink payload reception instants, i.e., reporting HARQ feedback aggregated for multiple received packets instead of individually sending dedicated HARQ feedback per received downlink packet. Conventional procedures do not implement the novel latency-aware HARQ feedback embodiment disclosed herein.

UE devices may be configured by a serving cell RAN, with a list or map of HARQ feedback combinations, with a configured length corresponding to combinations, which length or combinations may be dynamically configured. A HARQ feedback combination may comprise a determined HARQ ACK, and NACK sequence over a certain number of former packet reception instances, where the HARQ NACK indication is a latency-aware indication and is associated with the maximum allowable latency of such packet retransmission as disclosed above. A UE device may select and only report the index value corresponding to a combination in a list that comprises determined HARQ combinations over the configured reporting period (e.g., a determined or configured number of packet reception instances.

Figure 5:
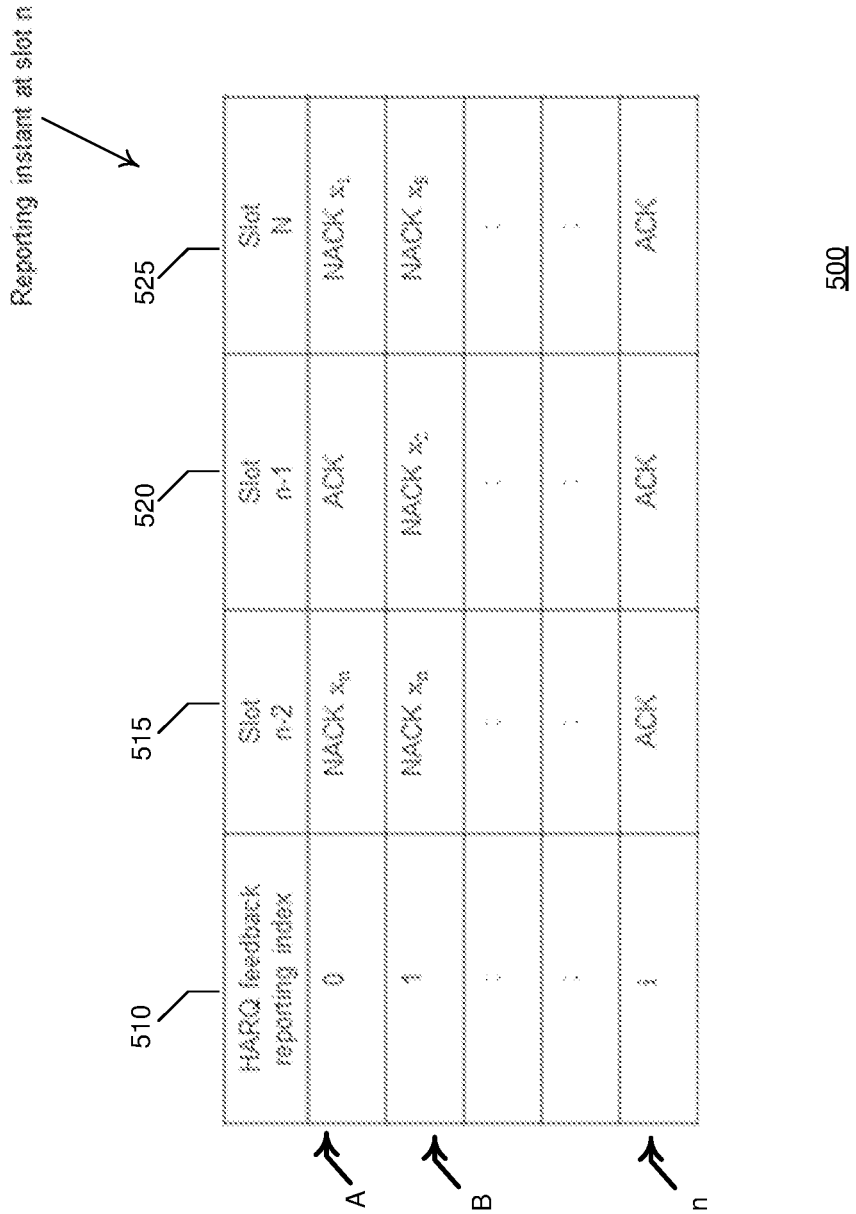
FIG. 5 illustrates an example retransmission request indication compression configuration.

HARQ feedback reporting may consume a substantial amount of uplink channel resource capacity since HARQ feedback may be frequent for a given UE device and for a single HARQ process ID or traffic flow. Adding latency awareness information to the HARQ NACK report may enlarge the size of the corresponding HARQ reports as described above (e.g., more than one bit for a latency-aware retransmission request indication). Accordingly, a latency-aware HARQ NACK reporting overhead compression embodiment may be used. In an embodiment, a HARQ reporting period may be defined such that a device only transmits a single HARQ feedback report over each configured period that indicates multiple feedback indications. Accordingly, a compressed latency-aware HARQ report may correspond to several latency-aware indications, either ACK or NACK indications, for packets received during a configured period. Therefore, as illustrated in FIG. 5, a retransmission request indication compression configuration, such as codebook 500, of HARQ feedback combinations may associate a compression index 510 with multiple HARQ retransmission request indications 515, 520, and 525. (It will be appreciated that some combinations of indices 515, 520, and 525 may comprise one or more ACK indications that indicate a packet at a corresponding packet instance was successfully received and decoded. A reporting period may span packet instances, or slots, n, n-1, n-2, and so on, where instant n may also be a reporting instance and where instants n-1 and n-2 indicate slots during which packets were received before a reception of a packet at slot n. As shown in codebook 500, a row A-n of the codebook corresponds to a configured HARQ feedback report sequence of ACKs and NACKs for the configured HARQ reporting period, which may be referred to as a compression reporting period, or simply a compression period. As depicted in FIG. 5, an example of a HARQ reporting period of three slots is configured where each row of the codebook indicates certain HARQ combinations of ACKs and latency-aware NACKs over the reporting period of three slots.

In case a UE device is not scheduled during any of the slots of the three-slot period, the UE device may be configured to report a predefined compression index corresponding to the three slots, or instants, such that a size of the HARQ reporting compression index is fixed to facilitate decoded at the serving RAN side without the need for blind decoding. Accordingly, UE devices, at each of the HARQ reporting periodicity instants (e.g., instant n shown in FIG. 5), may transmit a single HARQ reporting compression index 510, or HARQ indication preamble, that corresponds to a combination of HARQ ACKs, and latency-aware NACKs 515, 520, and 525 (e.g., a row of the configured HARQ reporting codebook 500) over the compression reporting period. HARQ reporting using a compression index, which may comprise a preamble or sequence transmission, instead of a bit-wise indication for every received packet, may be more resistant to channel errors that may flip an indication to appear as another erroneous indication, and thus may enhance reliability of HARQ reporting.

Figure 6:
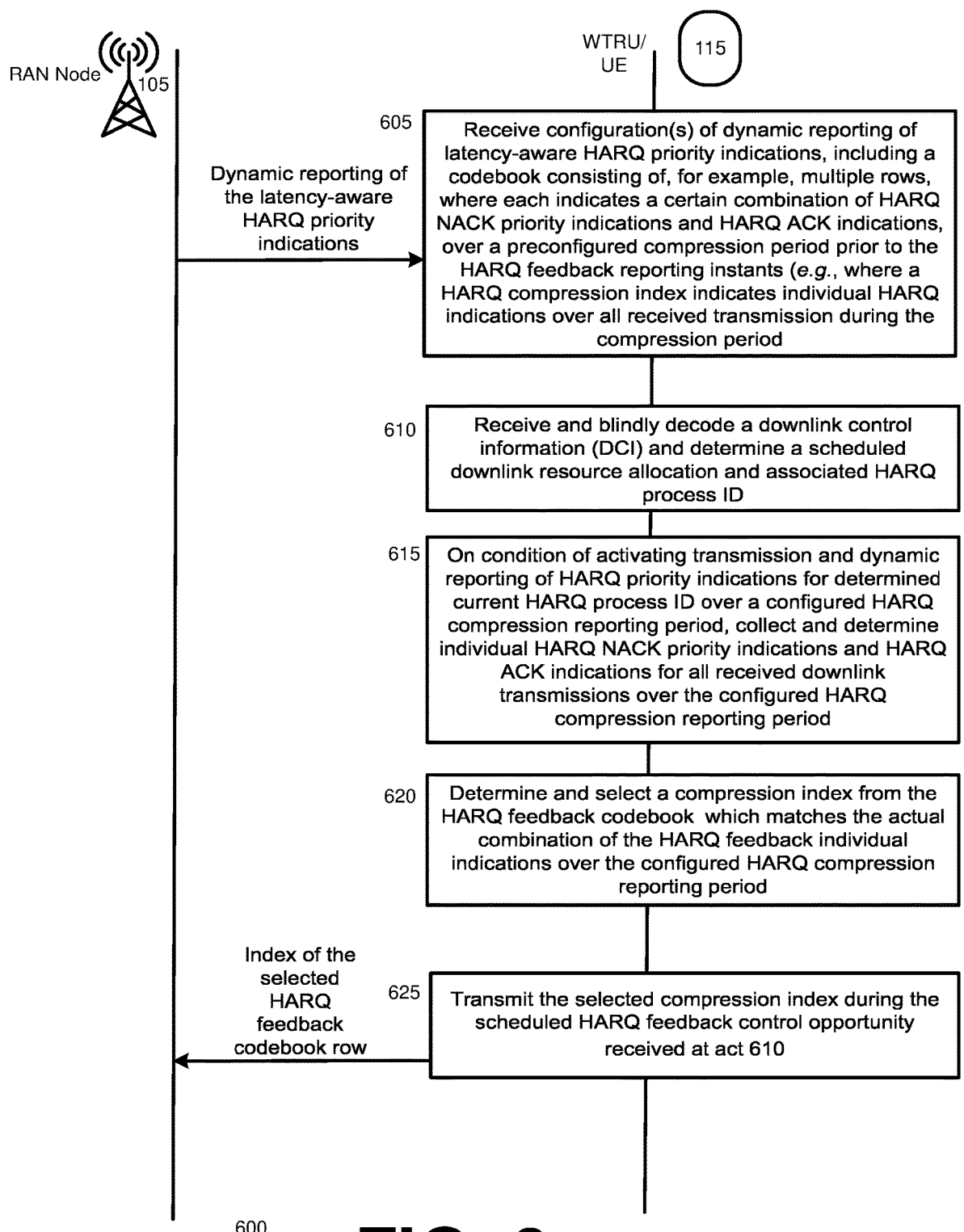
FIG. 6 illustrates a timing diagram of an example method to compress retransmission request indications.

Turning now to FIG. 6, the figure illustrates a timing diagram of an embodiment method 600 for a UE 115 to use a compressed retransmission request indication, such as a compression index described in reference to FIG. 5. Continuing with description of FIG. 6, at act 605 UE/WTRU 115 receives from serving RAN node 105, configurations of dynamic reporting of the latency-aware HARQ priority indications, which may comprise an indication compression codebook having one or more entries, or rows, where each entry comprises a combination of HARQ NACK priority indications or HARQ ACK indications, over a configured compression period (e.g., configured packet reception instances) that begins before, and terminates at, a configured HARQ feedback reporting instant (e.g., when a HARQ feedback report is transmitted and indicates a compression index corresponding to individual HARQ indications for received packet transmissions during the compression period. At act 610 UE/WTRU 115 receives and blindly decodes a downlink control information and determines scheduled downlink resources to be allocated, or that have been allocated, to be used for receiving a downlink traffic flow and determines one or more HARQ process identifier (s) to be used in connection with reporting HARQ indications. At act 615, on condition of activating transmission and dynamic reporting of HARQ priority indications for a determined current HARQ process identifier over a configured HARQ compression reporting period, UE/WTRU 115 collects and determines individual latency-aware HARQ NACK priority indications and HARQ ACK indications for downlink packet transmissions received over the configured HARQ compression reporting period. At act 620 UE/WTRU 115 determines and selects a compression index from a HARQ compression feedback codebook corresponding to a combination of individual HARQ feedback indications that match actual ACK or NACK indications that would otherwise be reported individually for packet receptions during the configured HARQ compression reporting period. At act 625 UE/WTRU transmits the compression index of the selected HARQ feedback codebook row determined at act 620 during the scheduled HARQ feedback control opportunity.

Figure 7:
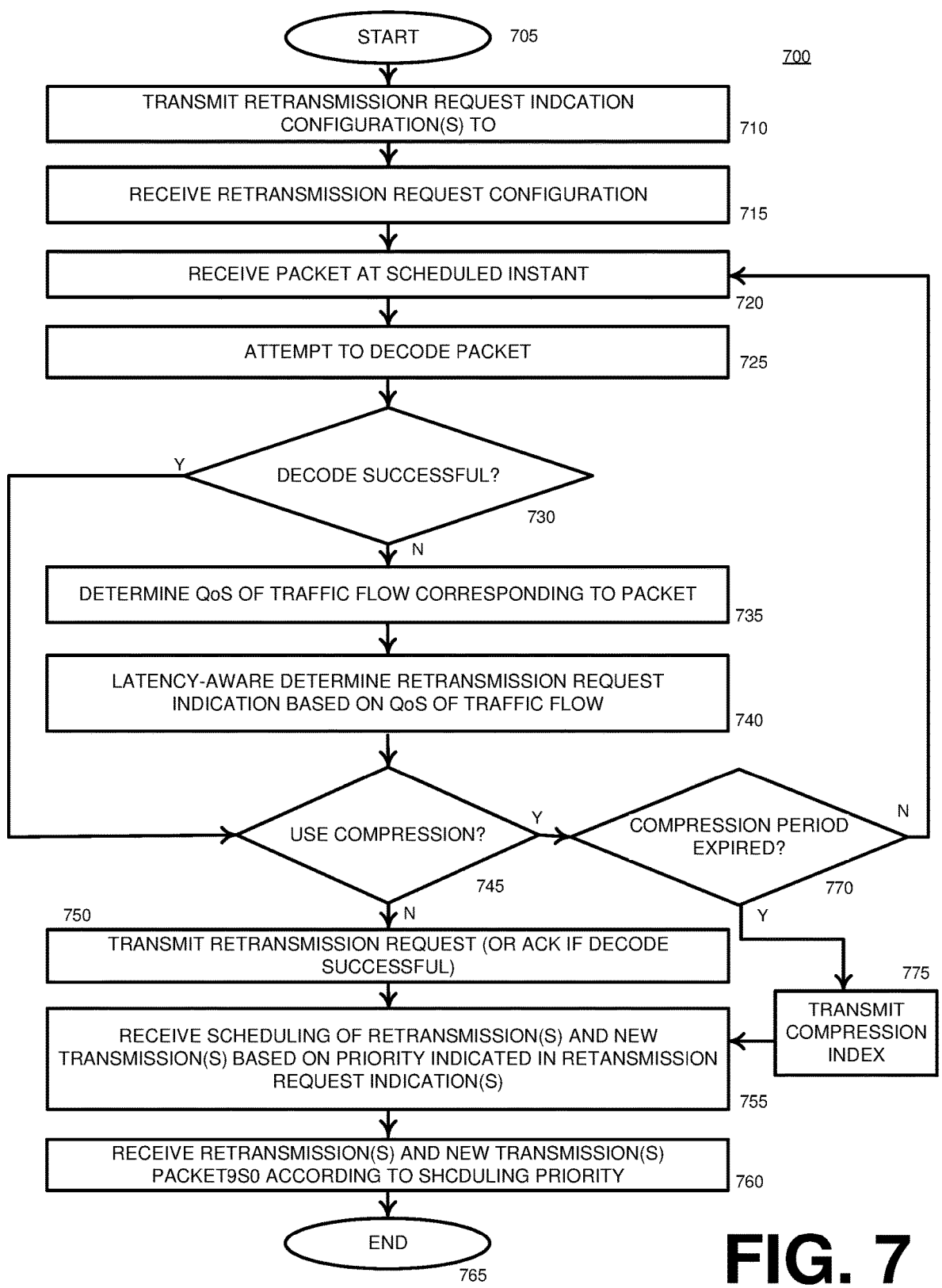
FIG. 7 illustrates a flow diagram of an example method to dynamically indicate retransmission requests, or no-acknowledgment requests, based on analyzed qualities of service.

Turning now to FIG. 7, the figure illustrates a flow diagram of an embodiment method 700 to configure a UE with a retransmission request configuration to be used by the UE to determine a retransmission request indication to be used by a RAN to prioritize packets for retransmission to the UE. Method 700 begins at act 705. At act 710, RAN node equipment transmits a retransmission request configuration, or configurations, to one or more user equipment. The RAN may transmit the retransmission request configuration via RRC signaling. At act 715, a user equipment receives a retransmission request configuration that may have been transmitted at act 710. At act 720, the user equipment receives a packet of a traffic flow at a previously scheduled instant for receiving traffic payload packet data. At act 725, the user equipment attempts to decode the packet that was received at act 720. At act 730, the user equipment determines whether the attempt to decode the packet at act 725 was successful. If a determination is made that decoding of the packet at act 725 was successful method 700 advances to act 745.

Returning to description of act 730, if the user equipment determines that the attempt at act 725 to decode the packet received at act 720 was not successful, method 700 advances to act 735. At act 735, the user equipment determines a quality of service associated with the traffic flow of which the packet received at act 720 is a part. The determination at act 735 may be performed by an application running on the user equipment, for example a VR application. The application may be managing multiple flows in support of a VR session. The flow of which the packet received at act 720 is a part may be one of the multiple flows being managed by the VR application and a different quality of service may be associated with the flow than another flow that the application is also managing for the VR session. It will be appreciated that a packet received at act 720, and a quality of service associated therewith, may correspond to a traffic flow, a quality-of-service requirement (e.g., a latency requirement), and an identifier associated with the traffic flow. At act 740, the user equipment determines a retransmission request indication using the retransmission request configuration received at act 715. The determination of the retransmission request indication may be based on the quality of service determined at act 735. The determination of the retransmission request indication at act 740 may be based on analysis of the quality of service determined at 735 with respect to a latency criterion, latency criteria, or a latency range, corresponding to the indication that is determined at act 740. An application, such as a VR application, at the user equipment may determine a latency criteria range to use to determine a retransmission request indication based on a sensed degradation of user experience corresponding to the traffic flow. For example, if the VR application detects that performance of a VR session in a pose portion of a VR appliance is within an acceptable performance range (which may correspond to, but may not necessarily be the same criteria, or range in a retransmission request configuration), the VR application may cause the user equipment to select a range and a corresponding retransmission request indication in a retransmission request configuration that corresponds to a first priority, but if the user's performance has degraded such that traffic facilitating vision in the pose portion of the VR application is causing distorted vision, the user equipment may determine that the traffic flow needs a higher quality of service and thus may select a retransmission request indication from the retransmission request configuration that has a higher priority than the first priority.

After determining the retransmission request indication at act 740, method 700 advances to act 745 and determines whether the user equipment has been configured to use compression of retransmission requests. The configuration received at act 715 may comprise a compression configuration that associates determined combinations of retransmission request indications, or acknowledgement indications indicative of successful decoding of received packets, with a compression index. The combination of acknowledgement indications (e.g., an ACK) or retransmission request indications (e.g., a latency-aware NACK) may comprise a determined number, or value, that corresponds to a determined number of packet instances at which packets are received at 720 for which decoding at act 725 is attempted. The determined number of packet instances may be referred to as a compression period.

If a determination is made at act 745 that the UE is configured to perform compression of retransmission request indications, method 700 advances to act 770. At act 770, the user equipment may determine that a compression period has not run (e.g., attempts at decoding a configured number of packets at act 725 has not been performed), in which case method 700 returns to act 720. If a determination is made at act 770 a determined or configured number of attempts to decode packets at act 725 has been performed, method 700 advances to act 775 and transmits a compression index. As an example, if a configured compression period comprises a configured number of five retransmission request indications or acknowledgement indications, and the user equipment determines at act 745 that compression of retransmission request indications is to be performed, five iterations of acts 720 through 745 may be performed. Upon determining at act 770 that a compression period, or number of iterations of attempting to decode packets, has not expired method 700 returns to act 720. If a number of attempts to decode packets at act 730 equals the determined number of packet instances in a configured compression period, method 700 advances to act 775. At act 775 the user equipment transmits a compression index corresponding to a configured combination of retransmission request indications or acknowledgement indications associated with the compression index.

Returning to discussion of act 745, if the user equipment determines that compression is not to be used, method 700 advances to act 750. At act 750, user equipment transmits a retransmission request indication if a decoding attempt at act 725 was successful, or an acknowledgement indication if decoding performed at act 725 was successful. The retransmission request, or acknowledgement indication, may be transmitted to a RAN that transmitted the configuration to the user equipment at act 710. At act 755, the user equipment receives scheduling of packet retransmission instances and scheduling of transmission of new packet instances (e.g., new packets being packets that have not been received at act 720 yet or for which decoding has not been attempted at act 725 yet), based on priority indicated in a retransmission request indication transmitted at act 750 or based on multiple retransmission indication requests indicated by a transmitted compression index transmitted at act 775. At act 760, the user equipment receives retransmitted packets or new packets according to a scheduled priority according to scheduling received at act 755. Method 700 advances to act 765 and ends.

Figure 8:
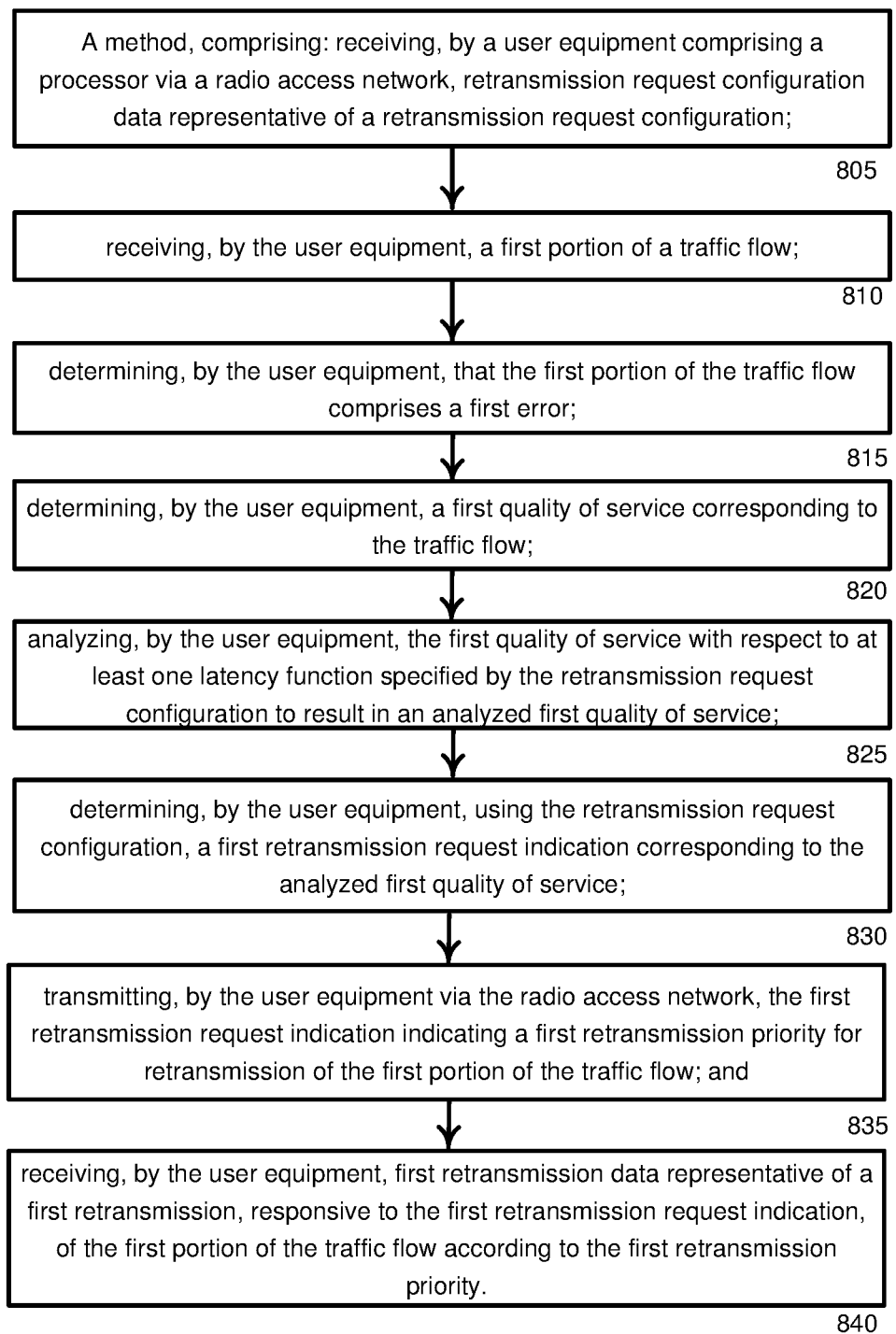
FIG. 8 illustrates a block diagram of an example method.

Turning now to FIG. 8, the figure illustrates an example embodiment method 800 comprising at block 805, receiving, by a user equipment comprising a processor via a radio access network, retransmission request configuration data representative of a retransmission request configuration; at block 810 receiving, by the user equipment, a first portion of a traffic flow; at block 815 determining, by the user equipment, that the first portion of the traffic flow comprises a first error; at block 820 determining, by the user equipment, a first quality of service corresponding to the traffic flow; at block 825 analyzing, by the user equipment, the first quality of service with respect to at least one latency function specified by the retransmission request configuration to result in an analyzed first quality of service; at block 830 determining, by the user equipment, using the retransmission request configuration, a first retransmission request indication corresponding to the analyzed first quality of service; at block 835 transmitting, by the user equipment via the radio access network, the first retransmission request indication indicating a first retransmission priority for retransmission of the first portion of the traffic flow; and at block 840 receiving, by the user equipment, first retransmission data representative of a first retransmission, responsive to the first retransmission request indication, of the first portion of the traffic flow according to the first retransmission priority.

Figure 9:
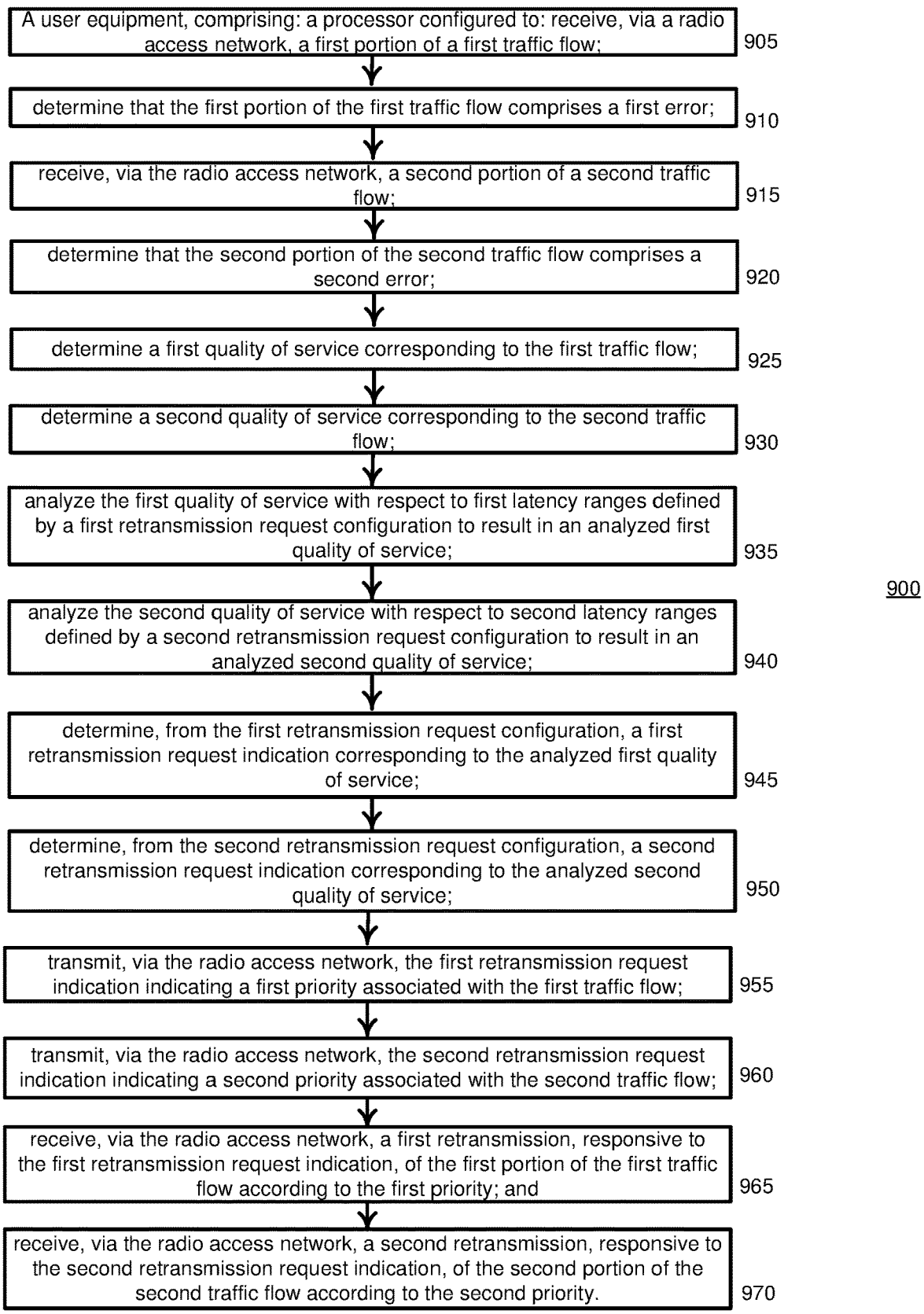
FIG. 9 illustrates a block diagram of an example user equipment.

Turning now to FIG. 9, the figure illustrates an example user equipment 900, comprising at block 905 a processor configured to: receive, via a radio access network, a first portion of a first traffic flow; at block 910 determine that the first portion of the first traffic flow comprises a first error; at block 915 receive, via the radio access network, a second portion of a second traffic flow; at block 920 determine that the second portion of the second traffic flow comprises a second error; at block 925 determine a first quality of service corresponding to the first traffic flow; at block 930 determine a second quality of service corresponding to the second traffic flow; at block 935 analyze the first quality of service with respect to first latency ranges defined by a first retransmission request configuration to result in an analyzed first quality of service; at block 940 analyze the second quality of service with respect to second latency ranges defined by a second retransmission request configuration to result in an analyzed second quality of service; at block 945 determine, from the first retransmission request configuration, a first retransmission request indication corresponding to the analyzed first quality of service; at block 950 determine, from the second retransmission request configuration, a second retransmission request indication corresponding to the analyzed second quality of service; at block 955 transmit, via the radio access network, the first retransmission request indication indicating a first priority associated with the first traffic flow; at block 960 transmit, via the radio access network, the second retransmission request indication indicating a second priority associated with the second traffic flow; at block 965 receive, via the radio access network, a first retransmission, responsive to the first retransmission request indication, of the first portion of the first traffic flow according to the first priority; and at block 970 receive, via the radio access network, a second retransmission, responsive to the second retransmission request indication, of the second portion of the second traffic flow according to the second priority.

Figure 10:
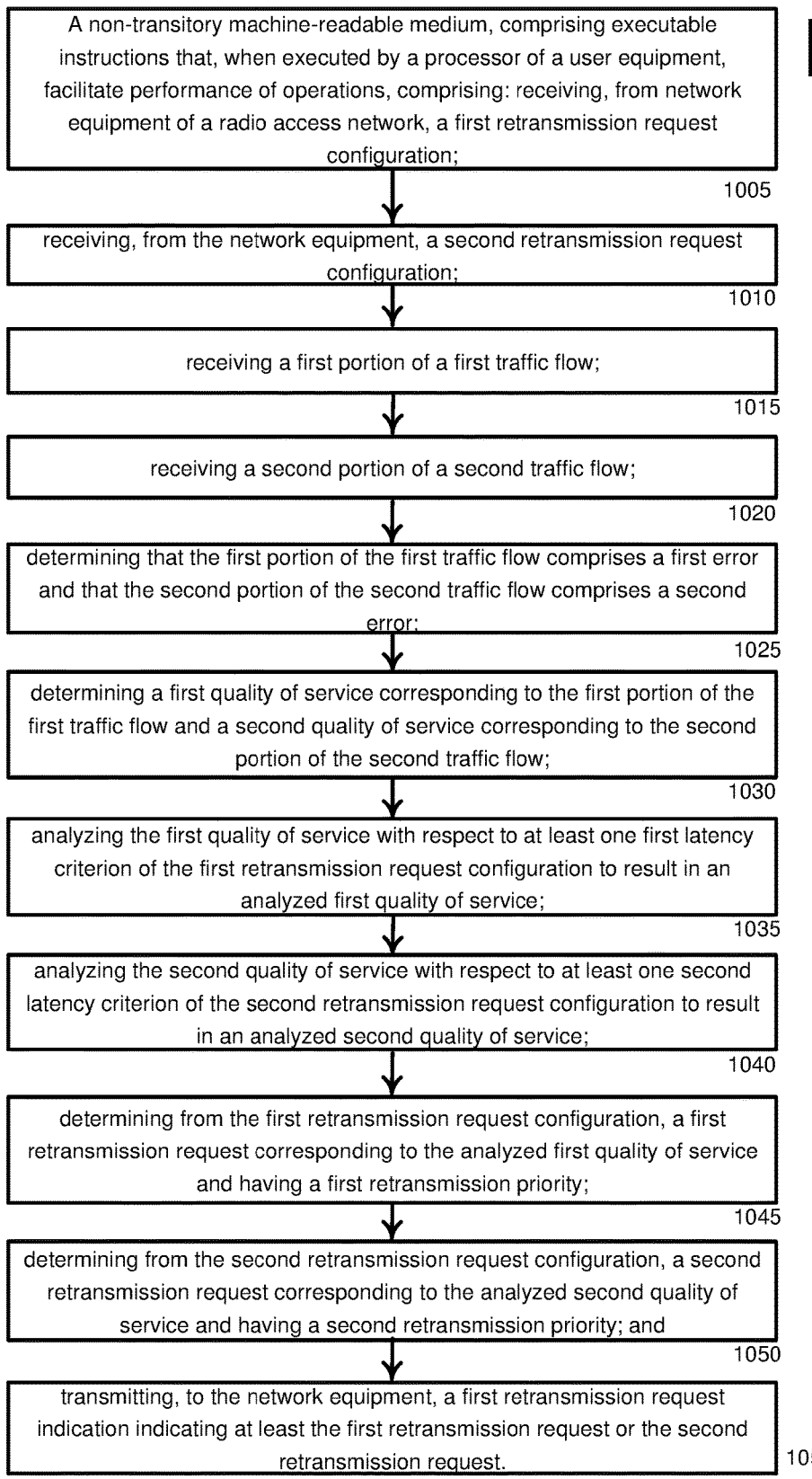
FIG. 10 illustrates a block diagram of an example non-transitory machine-readable medium.

Turning now to FIG. 10, the figure illustrates a non-transitory machine-readable medium 1000 comprising at block 1005 a non-transitory machine-readable medium, comprising executable instructions that, when executed by a processor of a user equipment, facilitate performance of operations, comprising: receiving, from network equipment of a radio access network, a first retransmission request configuration; at block 1010 receiving, from the network equipment, a second retransmission request configuration; at block 1015 receiving a first portion of a first traffic flow; at block 1020 receiving a second portion of a second traffic flow; at block 1025 determining that the first portion of the first traffic flow comprises a first error and that the second portion of the second traffic flow comprises a second error; at block 1030 determining a first quality of service corresponding to the first portion of the first traffic flow and a second quality of service corresponding to the second portion of the second traffic flow; at block 1035 analyzing the first quality of service with respect to at least one first latency criterion of the first retransmission request configuration to result in an analyzed first quality of service; at block 1040 analyzing the second quality of service with respect to at least one second latency criterion of the second retransmission request configuration to result in an analyzed second quality of service; at block 1045 determining from the first retransmission request configuration, a first retransmission request corresponding to the analyzed first quality of service and having a first retransmission priority; at block 1050 determining from the second retransmission request configuration, a second retransmission request corresponding to the analyzed second quality of service and having a second retransmission priority; and at block 1055 transmitting, to the network equipment, a first retransmission request indication indicating at least the first retransmission request or the second retransmission request.

Figure 11:
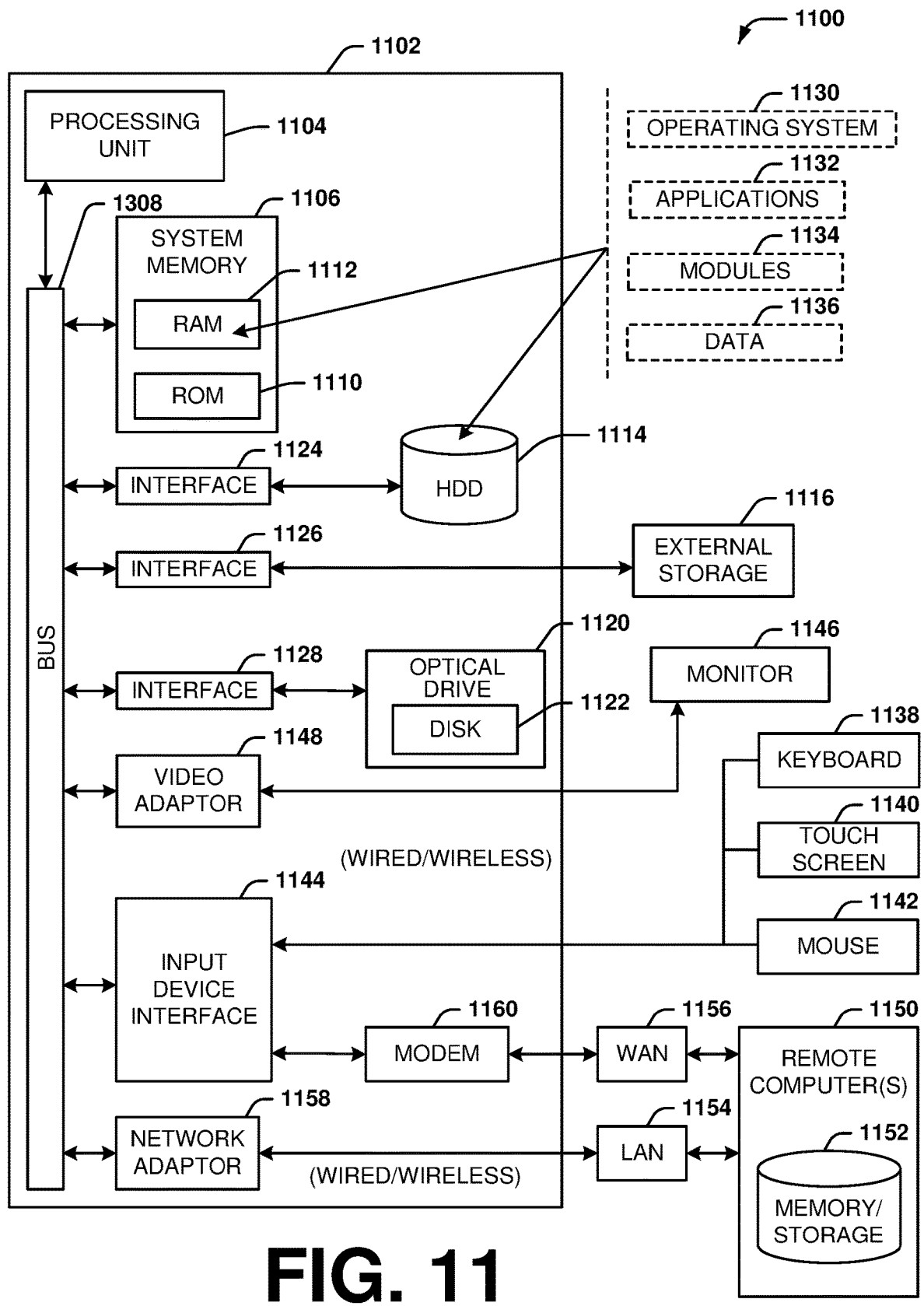
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
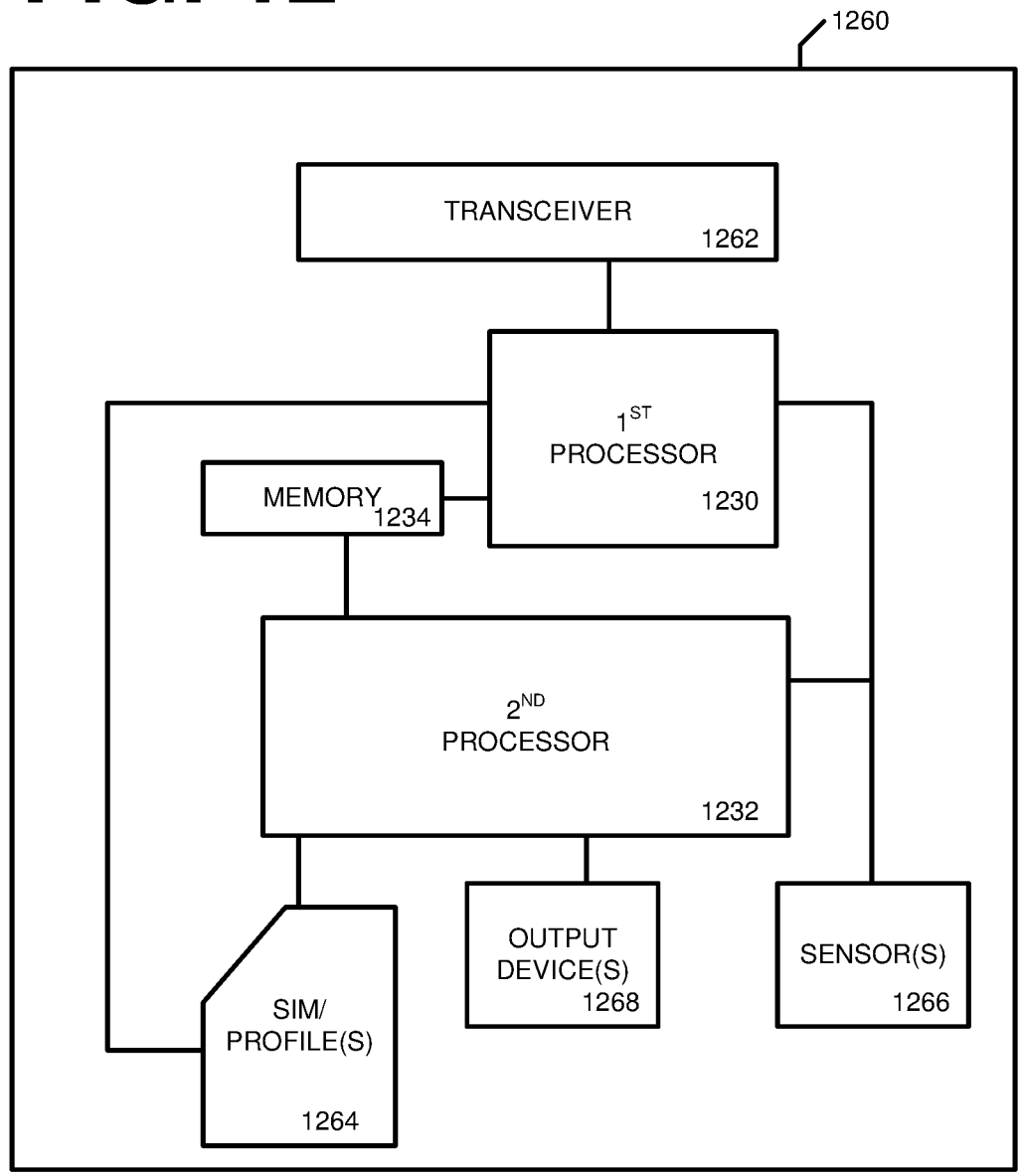
FIG. 12 illustrates a block diagram of an example wireless UE.

Turning to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, a tracking device, remote sensing devices, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 121264 that second processor 1232 may request, thus eliminating the use of the first processor acting as a 'go-between' when the second processor uses information from the SIM in performing its functions and in executing applications. First processor 1230, which may be a modem processor or a baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| QCI | QoS Class Identifiers |
| BSR | Buffer status report |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising a processor via a radio access network, retransmission request configuration data representative of a retransmission request configuration;

receiving, by the user equipment, a first portion of a traffic flow;

determining, by the user equipment, that the first portion of the traffic flow comprises a first error;

determining, by the user equipment, a first quality of service corresponding to the traffic flow;

analyzing, by the user equipment, the first quality of service with respect to at least one latency function specified by the retransmission request configuration to result in an analyzed first quality of service;

determining, by the user equipment, using the retransmission request configuration, a first retransmission request indication corresponding to the analyzed first quality of service;

transmitting, by the user equipment via the radio access network, the first retransmission request indication indicating a first retransmission priority for retransmission of the first portion of the traffic flow; and receiving, by the user equipment, first retransmission data representative of a first retransmission, responsive to the first retransmission request indication, of the first portion of the traffic flow according to the first retransmission priority.

2. The method of claim 1, wherein the analyzing of the first quality of service comprises analyzing the quality of service of an application, to which the traffic flow is directed, executing on the user equipment.

3. The method of claim 1, wherein the first retransmission request indication comprises a hybrid automatic repeat request.

4. The method of claim 1, wherein the retransmission request configuration associates at least one retransmission request indication index value with respective at least one retransmission request range, and wherein the first retransmission request indication comprises a retransmission request indication index value, of the at least one retransmission request indication index value, corresponding to a retransmission request range, of the at least one retransmission request range, that corresponds to the analyzed first quality of service.

5. The method of claim 1, wherein the at least one latency function comprises at least one corresponding latency range criterion.

6. The method of claim 1, wherein a size of the retransmission request indication corresponds inversely to a quantity of the at least one latency function specified by the retransmission request configuration.

7. The method of claim 1, further comprising:

receiving, by the user equipment, a second portion of the traffic flow;

determining, by the user equipment, that the second portion of the traffic flow comprises a second error;

determining, by the user equipment, a second quality of service corresponding to the second portion of the traffic flow;

analyzing, by the user equipment, the second quality of service with respect to the at least one latency function specified by the retransmission request configuration to result in an analyzed second quality of service;

determining, by the user equipment from the retransmission request configuration, a second retransmission request indication corresponding to the analyzed second quality of service;

transmitting, by the user equipment via the radio access network, the second retransmission request indication indicating a second retransmission priority for retransmission of the second portion of the traffic flow; and receiving, by the user equipment responsive to the second retransmission request indication, second retransmission data representative of a second retransmission of the second portion of the traffic flow according to the second retransmission priority, wherein the second retransmission priority is different than the first retransmission priority.

8. The method of claim 7, further comprising:

receiving, by the user equipment, a third portion of the traffic flow;

determining, by the user equipment, that the third portion of the traffic flow comprises a third error;

determining, by the user equipment, a third quality of service corresponding to the third portion of the traffic flow;

analyzing, by the user equipment, the third quality of service with respect to the at least one latency function specified by the retransmission request configuration to result in an analyzed third quality of service;

determining, by the user equipment from the retransmission request configuration, a no-retransmission acknowledgment indication corresponding to the third quality of service; and transmitting, via the radio access network, the no-retransmission acknowledgment indication.

9. The method of claim 7, wherein, in the retransmission request configuration, the first retransmission priority and the second retransmission priority correspond to traffic having a first importance and a second importance, respectively, according to a defined importance criterion, and wherein the first retransmission priority and the second retransmission priority are higher than a default retransmission priority associated with a default retransmission request indication.

10. The method of claim 9, wherein the default retransmission request indication comprises a one-bit indication.

11. The method of claim 1, wherein the retransmission request configuration data representative of the retransmission request configuration comprises retransmission request indication compression configuration data representative of a retransmission request indication compression configuration, and wherein the retransmission request indication compression configuration associates at least one compression index with at least one respective combination of a determined number of retransmission request indications corresponding to a determined number of packet receptions for which a retransmission request indication or an acknowledgment indication is to be transmitted by the user equipment.

12. A user equipment, comprising:

a processor configured to:

receive, via a radio access network, a first portion of a first traffic flow;

determine that the first portion of the first traffic flow comprises a first error;

receive, via the radio access network, a second portion of a second traffic flow;

determine that the second portion of the second traffic flow comprises a second error;

determine a first quality of service corresponding to the first traffic flow;
determine a second quality of service corresponding to the second traffic flow;
analyze the first quality of service with respect to first latency ranges defined by a first retransmission request configuration to result in an analyzed first quality of service;
analyze the second quality of service with respect to second latency ranges defined by a second retransmission request configuration to result in an analyzed second quality of service;
determine, from the first retransmission request configuration, a first retransmission request indication corresponding to the analyzed first quality of service;
determine, from the second retransmission request configuration, a second retransmission request indication corresponding to the analyzed second quality of service;
transmit, via the radio access network, the first retransmission request indication indicating a first priority associated with the first traffic flow;
transmit, via the radio access network, the second retransmission request indication indicating a second priority associated with the second traffic flow;
receive, via the radio access network, a first retransmission, responsive to the first retransmission request indication, of the first portion of the first traffic flow according to the first priority; and
receive, via the radio access network, a second retransmission, responsive to the second retransmission request indication, of the second portion of the second traffic flow according to the second priority.

13. The user equipment of claim 12, wherein the processor is further configured to receive a scheduling indication via the radio access network indicating scheduling of downlink resources to be used to receive the first retransmission and the second retransmission, and wherein the scheduling of downlink resources is based on the first priority and the second priority.

14. The user equipment of claim 12, wherein the processor is further configured to:
receive a third portion of the first traffic flow associated with a third priority, wherein the first portion of the first traffic flow and the second portion of the second traffic flow are received before the third portion of the first traffic flow, and wherein the third portion of the first traffic flow is received before the first retransmission of the first portion of the first traffic flow is received and before the second retransmission of the second portion of the second traffic flow is received, based on the third priority being higher than the first priority and the second priority.

15. The user equipment of claim 12, wherein the first retransmission request configuration comprises first retransmission request indication indices corresponding to the first latency ranges, wherein the second retransmission request configuration comprises second retransmission request indication indices corresponding to the second latency ranges, and wherein each of the first retransmission request indication indices comprises a first number of bits corresponding to the first priority and each of the second retransmission request indication indices comprises a second number of bits corresponding to the second priority.

16. The user equipment of claim 15, wherein the first number of bits is higher than the second number of bits in correspondence with the first priority being higher than the second priority.

17. A non-transitory machine-readable medium, comprising executable instructions that, when executed by a processor of a user equipment, facilitate performance of operations, comprising:
receiving, from network equipment of a radio access network, a first retransmission request configuration;
receiving, from the network equipment, a second retransmission request configuration;
receiving a first portion of a first traffic flow;
receiving a second portion of a second traffic flow;
determining that the first portion of the first traffic flow comprises a first error and that the second portion of the second traffic flow comprises a second error;
determining a first quality of service corresponding to the first portion of the first traffic flow and a second quality of service corresponding to the second portion of the second traffic flow;
analyzing the first quality of service with respect to at least one first latency criterion of the first retransmission request configuration to result in an analyzed first quality of service;
analyzing the second quality of service with respect to at least one second latency criterion of the second retransmission request configuration to result in an analyzed second quality of service;
determining from the first retransmission request configuration, a first retransmission request corresponding to the analyzed first quality of service and having a first retransmission priority;
determining from the second retransmission request configuration, a second retransmission request corresponding to the analyzed second quality of service and having a second retransmission priority; and
transmitting, to the network equipment, a first retransmission request indication indicating at least the first retransmission request or the second retransmission request.

18. The non-transitory machine-readable medium of claim 17, wherein the first retransmission request is a first one of multiple first retransmission requests that are represented in the first retransmission request configuration,
wherein each of the multiple first retransmission requests comprises a first number of bits corresponding to the first quality of service,
wherein the second retransmission request is a second one of multiple second retransmission requests that are represented in the second retransmission request configuration,
wherein each of the multiple second retransmission requests comprises a second number of bits corresponding to the second quality of service, and
wherein the first number of bits and the second number of bits are different.

19. The non-transitory machine-readable medium of claim 17, the operations further comprising:
receiving a third portion of the second traffic flow;
determining a third quality of service corresponding to the third portion of the second traffic flow;
analyzing the third quality of service with respect to the at least one second latency criterion of the second retransmission request configuration to result in an analyzed third quality of service;

determining from the second retransmission request configuration, a third retransmission request corresponding to the analyzed third quality of service; and transmitting, to the network equipment, a second retransmission request indication indicating the third retransmission request.

20. The non-transitory machine-readable medium of claim 17, wherein the first retransmission request indication comprises a compression index that corresponds to the first retransmission request and the second retransmission request, wherein the first retransmission request comprises a first number of bits and the second retransmission request comprises a second number of bits, and wherein the compression index comprises fewer bits than a sum of the first number of bits and the second number of bits.

* * * * *